United States Patent
Hu et al.

(10) Patent No.: US 12,454,712 B2
(45) Date of Patent: Oct. 28, 2025

(54) METHOD FOR LARGE-SCALE SYNTHESIS OF LONG-CHAIN RNA AND METHOD FOR SITE-SPECIFIC MODIFICATION OF LONG-CHAIN RNA

(71) Applicant: ShenZhen Rhegen Biotechnology Co., Ltd., Shenzhen (CN)

(72) Inventors: Yong Hu, Shenzhen (CN); Miaomiao Zhang, Shenzhen (CN)

(73) Assignee: ShenZhen Rhegen Biotechnology Co., Ltd., Shenzhen (CN)

( * ) Notice: Subject to any disclaimer, the term of this patent is extended or adjusted under 35 U.S.C. 154(b) by 694 days.

(21) Appl. No.: 17/813,290

(22) Filed: Jul. 18, 2022

(65) Prior Publication Data

US 2022/0372538 A1    Nov. 24, 2022

Related U.S. Application Data

(63) Continuation of application No. PCT/CN2020/136416, filed on Dec. 15, 2020.

(30) Foreign Application Priority Data

Jan. 20, 2020    (CN) .......................... 202010068138.0

(51) Int. Cl.
  *C12P 19/34*  (2006.01)
  *C12N 9/00*   (2006.01)
  *C12N 9/16*   (2006.01)

(52) U.S. Cl.
  CPC .............. *C12P 19/34* (2013.01); *C12N 9/16* (2013.01); *C12N 9/93* (2013.01); *C12Y 301/03033* (2013.01)

(58) Field of Classification Search
  CPC ...................................................... C12N 9/93
  See application file for complete search history.

(56) References Cited

U.S. PATENT DOCUMENTS

2020/0362382 A1*    11/2020    Ott ........................ C07H 21/02

OTHER PUBLICATIONS

Akiyama, Benjamin M., and Michael D. Stone. "Assembly of complex RNAs by splinted ligation." Methods in enzymology. vol. 469. Academic Press, 2009. 27-46. (Year: 2009).*
Oliver, José L., and Antonio Marín. "A relationship between GC content and coding-sequence length." Journal of molecular evolution 43 (1996): 216-223 (Year: 1996).*

* cited by examiner

*Primary Examiner* — Robert J Yamasaki
(74) *Attorney, Agent, or Firm* — Rothwell, Figg, Ernst & Manbeck, P.C.

(57) ABSTRACT

Provided are a method for large-scale synthesis of a long-chain RNA and a method for site-specific modification of the long-chain RNA. The method for large-scale synthesis of a long-chain RNA comprises: designing short RNA fragments and splint DNA fragments; ligating; capping; and removing the splint DNA fragments and other steps. A large number of short RNA fragments and different splint DNA fragments are chemically synthesized, and then the different short RNA fragments are ligated by a biological method so as to form a target long-chain RNA. The product long-chain RNA has a low mutation rate, a plurality of the short RNA fragments can be assembled in a single reaction, and the long-chain RNA can be synthesized at a high throughput so as to fulfill the large-scale production of the long-chain RNA. In addition, by chemical modification of the short RNA fragments, the site-specific modification of the long-chain RNA can be realized.

20 Claims, 9 Drawing Sheets

METHOD FOR LARGE-SCALE SYNTHESIS OF LONG-CHAIN RNA AND METHOD FOR SITE-SPECIFIC MODIFICATION OF LONG-CHAIN RNA

The present application is a continuation application of International Application No. PCT/CN2020/136416, filed Dec. 15, 2020, which claims the priority of the Chinese Patent Application No. 202010068138.0, filed with the China National Intellectual Property Administration (CNIPA) on Jan. 20, 2020, and entitled "METHOD FOR LARGE-SCALE SYNTHESIS OF LONG-CHAIN RNA AND METHOD FOR SITE-SPECIFIC MODIFICATION OF LONG-CHAIN RNA", each of which is incorporated herein by reference in its entirety.

TECHNICAL FIELD

The present invention relates to the technical field of gene engineering and particularly relates to a method for large-scale synthesis of a long-chain RNA and a method for site-specific modification of the long-chain RNA.

BACKGROUND

With the rapid development of biotechnology, RNA technologies such as siRNA, non-coding RNA, RNA aptamer, ribozyme, etc. are rapidly developed, and RNA is getting more attention in biology (John C, et al. Chemistry&Biology. 2012, 19(1): 60-71). However, as more and more RNA biological researches and drug developments require the use of high-purity RNA in milligram-level or even gram-level, some previous synthetic methods have gradually failed to meet requirements of scientific research experiment and drug development on RNA. At the same time, higher requirements are also made for quality of RNA products (Laura E, et al. RNA. 2010, 16(3): 647-653). Currently, the main method for RNA synthesis is the chemical synthesis method. This method has the biggest advantage of large-scale synthesis, but there are also some disadvantages and technical limitations. On the one hand, the method has a high cost. On the other hand, the existing synthesis technology can only synthesize short-chain RNA molecules, and once the length of the synthesized RNA exceeds about 170 nt, the synthesis efficiency is greatly reduced and sequences of byproducts are increased, which not only increases difficulty of downstream purification but also further increases the cost (Zhonghua Zhang, Chinese Bulletin of Life Sciences, 2004, 16(4):231-235) (Junichi Yano, et al. Advance in Polymer Science, 2012, 2491-48) (Songzi Zhao, et al. Acta Agriculturae Boreali-occidentalis Sinica, 2010, 16(5): 47-51). At present, most researchers often obtain RNA of larger than about 40 nt by a transcription synthesis method, i.e., the T7, T3 or SP6 RNA polymerase is used to transcribe a double-stranded DNA template with its promoter to obtain a long single-stranded RNA (S A McKenna, et al. Nature Protocols. 2007. 2, 3270-3277). Typically, one copy of a DNA template can produce tens to hundreds of copies of RNA by optimizing concentrations of $Mg^{2+}$ and nucleotide triphosphates (rNTPs) in transcription conditions, thus a larger amount of RNA products can be obtained by the method. However, since 2'-OH needs to be protected in the process of chemical synthesis, the chemical synthesis of RNA is more difficult than that of DNA. At present, the chemically synthesized RNA has a length of no more than 170 nt, which cannot meet the synthesis requirement of a long-chain RNA with a length of more than 1,000 nt.

The biosynthesis method of RNA has many advantages, for example, labeling with isotopes or fluorescent dyes can be conducted and the transcription length is not limited, etc., thus the method is widely used for structural or biological studies of nucleic acids. Nevertheless, there are also some problems with synthesis of RNA molecules via transcription: stable large-scale production cannot be realized. The reason is that the RNA polymerase is needed for in vitro synthesis of RNA with different lengths via transcription, which leads to a certain probability of mismatching in biological reaction and thus causes mutation of an RNA sequence. This is not beneficial to scale-up production. Meanwhile, a large amount of plasmids need to be prepared and digested into linear plasmids by a DNA restriction enzyme; or linear templates need to be obtained by a large number of PCR reactions, while a single-stranded DNA as a transcription template for the long-chain RNA with a stable secondary structure (the number of incomplete or complete complementary bases at the 5' end and the 3' end of the RNA molecule is no less than 5) also have a stable secondary structure, resulting in the production of non-specific or mutant DNA products when the transcription templates are amplified by using DNA primers in PCR. The RNA transcribed by the non-target DNA has a biological function quite different from that of the target RNA, such that a sufficient amount of correct DNA transcription templates cannot be obtained by the PCR method.

SUMMARY

The main objective of the present invention is to provide a method for large-scale synthesis of a long-chain RNA and a method for site-specific modification of the long-chain RNA. In the method, a large number of short RNA fragments are first chemically synthesized, and then the short RNA fragments are ligated to form a long-chain RNA by a biosynthesis method, so as to overcome the problem that large-scale production of a long-chain RNA cannot be realized in the related technologies.

To achieve the above objective, the present invention provides a method for large-scale synthesis of a long-chain RNA, comprising:

a, designing short RNA fragments and splint DNA fragments: designing a plurality of short RNA fragments according to a target single-stranded RNA to enable a plurality of the short RNA fragments to be combined to form at least one complete target single-stranded RNA; designing splint DNA fragments according to the short RNA fragments; and mixing a plurality of the short RNA fragments with the splint DNA fragments to obtain a ligation mixture;

b, ligating: adding a DNA ligase and an RNA ligase to the ligation mixture in step a, so as to ligate a plurality of the short RNA fragments and a plurality of the splint DNA fragments by the DNA ligase, and ligate the short RNA fragments and a 3' polyA tail by the RNA ligase to obtain an uncapped long-chain RNA;

c, capping: adding a capping enzyme to the uncapped long-chain RNA in step b, so as to add a cap structure to a 5' end of the uncapped long-chain RNA to obtain a capped long-chain RNA; and d, removing the splint DNA fragments: adding a DNase to the capped long-chain RNA in step c to remove the splint DNA ligated in the capped long-chain RNA to obtain the desired long-chain RNA.

Preferably, the GC base content of the short RNA fragments at 5' end and 3' end is higher than 15%; and the GC base content of the splint DNA fragments at 5' end and 3' end is higher than 15%.

Preferably, in the ligation mixture of step a, the molar concentration ratio of the short RNA fragments to the splint DNA fragments is 8-10:11.

Preferably, the capping enzyme comprises one or a combination of RNA triphosphatase, RNA guanyltransferase, guanine-7-methyltransferase or 2-O-methyltransferase.

Preferably, the cap structure in step c comprises a Cap 0 structure or a Cap 1 structure.

Preferably, the short RNA fragment has a length of 100-170 nt; and the splint DNA has a length of 30 bp-40 bp.

Preferably, removing the splint DNA fragments in step d comprises adding the DNase to the capped long-chain RNA in step c to remove the splint DNA ligated in the capped long-chain RNA to obtain the desired long-chain RNA, and the method further comprises the following steps after step d:

e, purifying: subjecting the long-chain RNA obtained in step d to at least one of lithium chloride/ethanol precipitation, centrifugal column, chlorine extraction/ethanol precipitation, gel purification or purification by high performance liquid chromatography to obtain a purified long-chain RNA; and f, purity detecting: subjecting the purified long-chain RNA obtained in step e to at least one of agarose or polyacrylamide gel electrophoresis, HPLC analysis and detection, endotoxin residue detection, DNA residue detection and protein residue detection.

The present invention further provides a method for site-specific modification of a long-chain RNA, comprising:

a1, designing and synthesizing the short RNA fragments and the splint DNA fragments in the method for large-scale synthesis of a long-chain RNA as described above, and conducting site-specific chemical modification on the designated short RNA fragments;

b1, ligating the synthesized short RNA fragments, the site-specific modified short RNA fragments and the splint DNA fragments in step a1 to obtain a site-specific modified uncapped long-chain RNA;

c1, capping the site-specific modified uncapped long-chain RNA obtained in step b1 to obtain a site-specific modified capped long-chain RNA;

d1, removing the splint DNA in the site-specific modified capped long-chain RNA obtained in step c1 to obtain the desired site-specific modified long-chain RNA; and e1, purifying the site-specific modified long-chain RNA obtained in step d1 and detecting purity of the purified site-specific modified long-chain RNA.

In the technical solution of the present invention, a large number of splint DNA fragments and different short RNA fragments (including the non-chemically modified short RNA fragments and the site-specific modified short RNA fragments) are first chemically synthesized, and then the different short RNA fragments are ligated by a biological method to form a target long-chain RNA. Specifically, the ligation between the different short RNA fragments and the splint DNA fragments is realized by the DNA ligase, the ligation between the short RNA fragments and the 3' polyA tail is realized by the RNA ligase, the 5'end of the uncapped long-chain RNA is capped by the capping enzyme (the capping enzyme includes, but is not limited to one or a combination of 2'-O-methyltransferase, RNA triphos- phatase, RNA guanyltransferase and guanine-7-methyltransferase), and finally the splint DNA fragments in the capped long-chain RNA are removed by the DNase to obtain the desired long-chain RNA. The whole process is simple to operate and has a low production cost. The product long-chain RNA has a low mutation rate, a plurality of the short RNA fragments can be assembled in a single reaction, and the long-chain RNA can be synthesized at a high throughput so as to fulfill large-scale production of the long-chain RNA. In addition, compared with the traditional RNA chemical modification method, the method uses a site-specific chemical modification strategy, which enables the RNA product to be more stable and have a reduced immunogenicity and significantly enhanced translation efficiency. Therefore, the method is of great significance for clinical application of RNA drugs.

BRIEF DESCRIPTION OF THE DRAWINGS

In order to more clearly illustrate the examples of the present invention or the technical solutions in the prior art, the drawings that need to be used in the description of the examples or the prior art will be briefly introduced below.

The implementation of objectives, functional characteristics, and advantages of the present invention will be further described with reference to the accompanying drawings.

DETAILED DESCRIPTION OF THE INVENTION

The technical solutions of the examples of the present invention will be clearly and completely described below with reference to the examples of the present invention and accompanying drawings thereof. Apparently, the described examples are merely a part rather than all of the examples of the present invention. All other examples obtained by a person of ordinary skill in the art based on the examples of the present invention without creative efforts shall fall within the protection scope of the present invention. Unless otherwise specified, the instruments, reagents, and materials, etc. involved in the following examples are all conventional instruments, reagents, and materials, etc. known in the prior art and can be commercially available. Unless otherwise specified, the experimental methods and detection methods, etc. involved in the following examples are all conventional experimental methods and detection methods, etc. known in the prior art.

Figure 1:
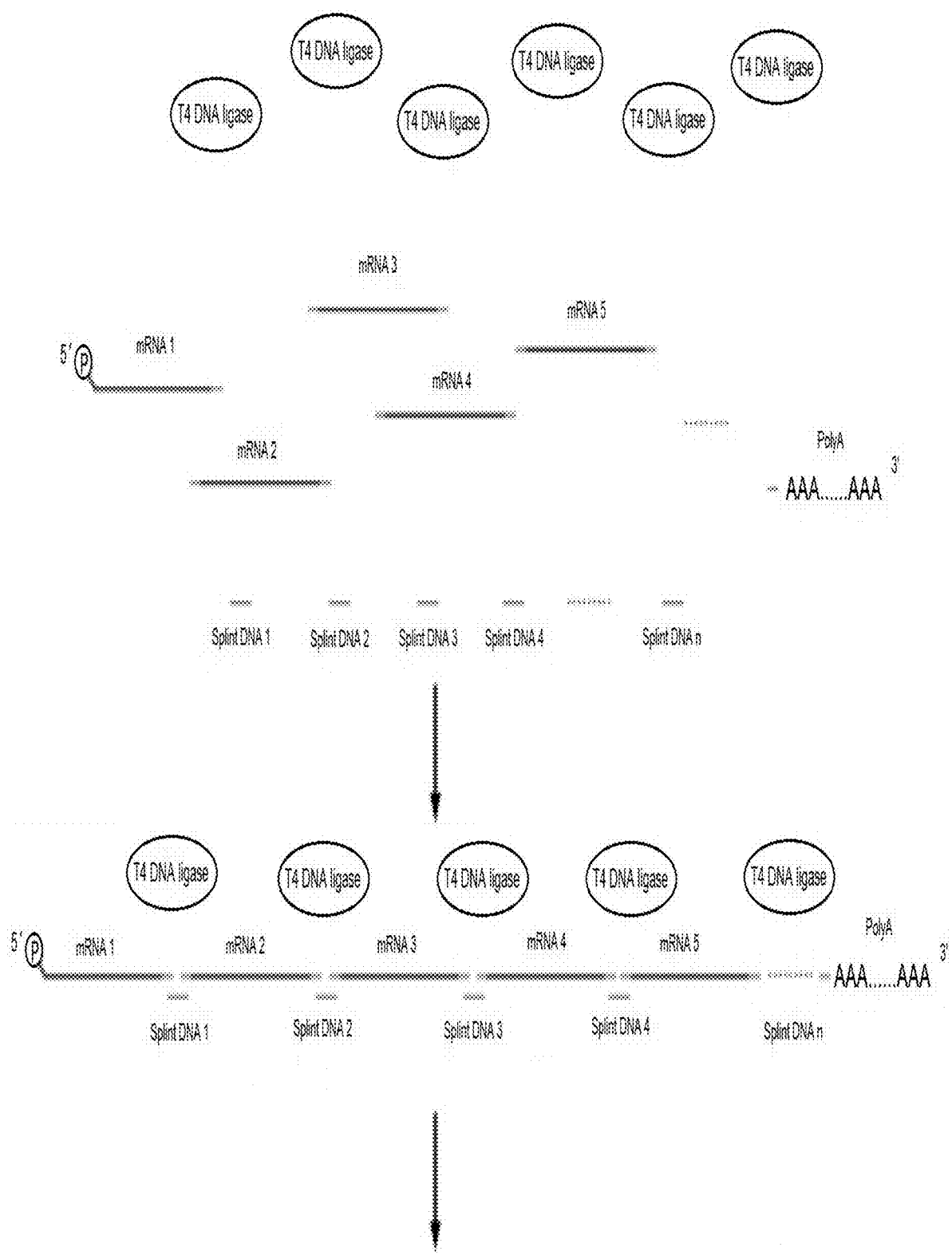
FIG. 1 is a process flow diagram for large-scale synthesis of a long-chain RNA according to the present invention.
Figure 1:
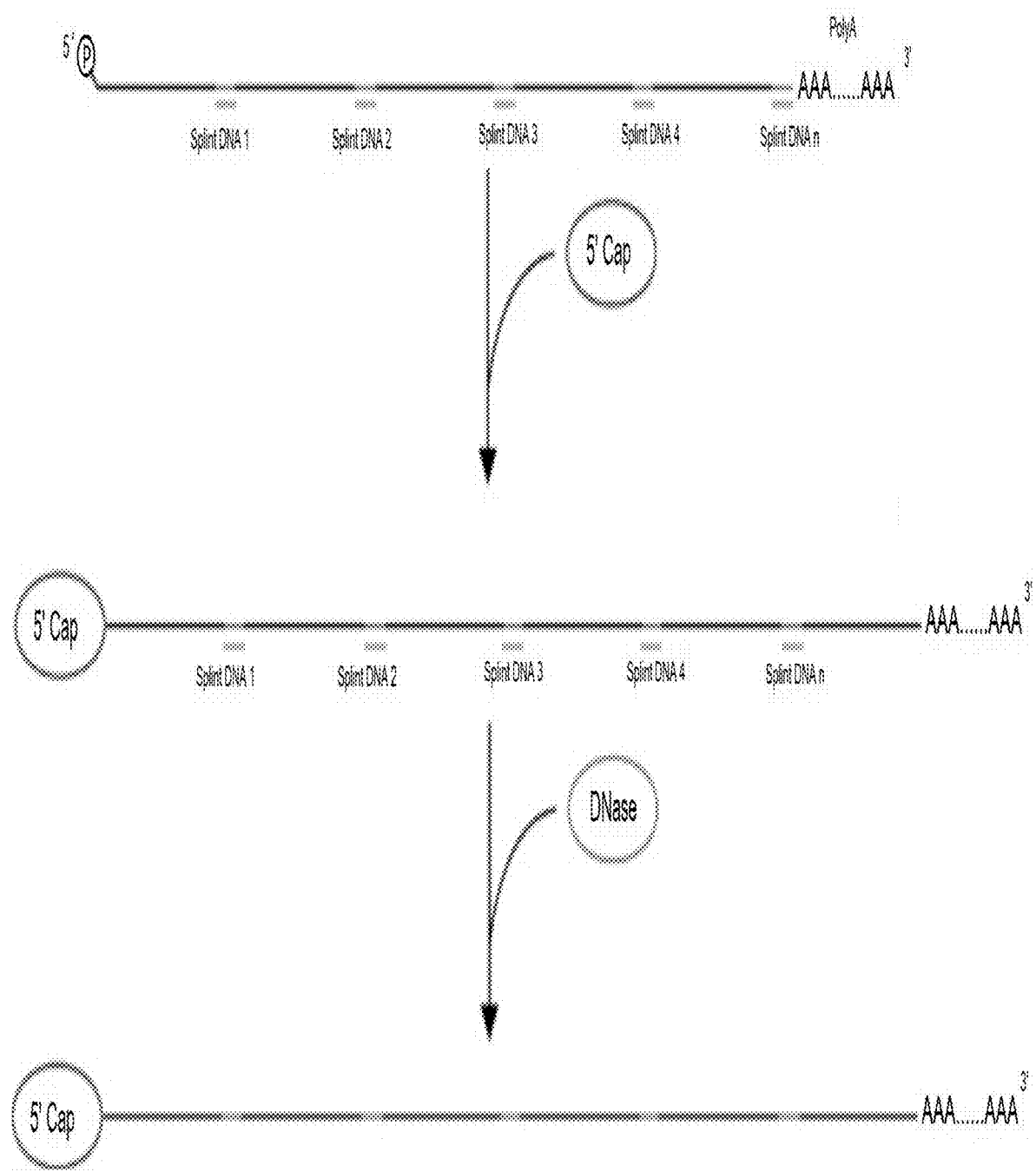
Figure 2:
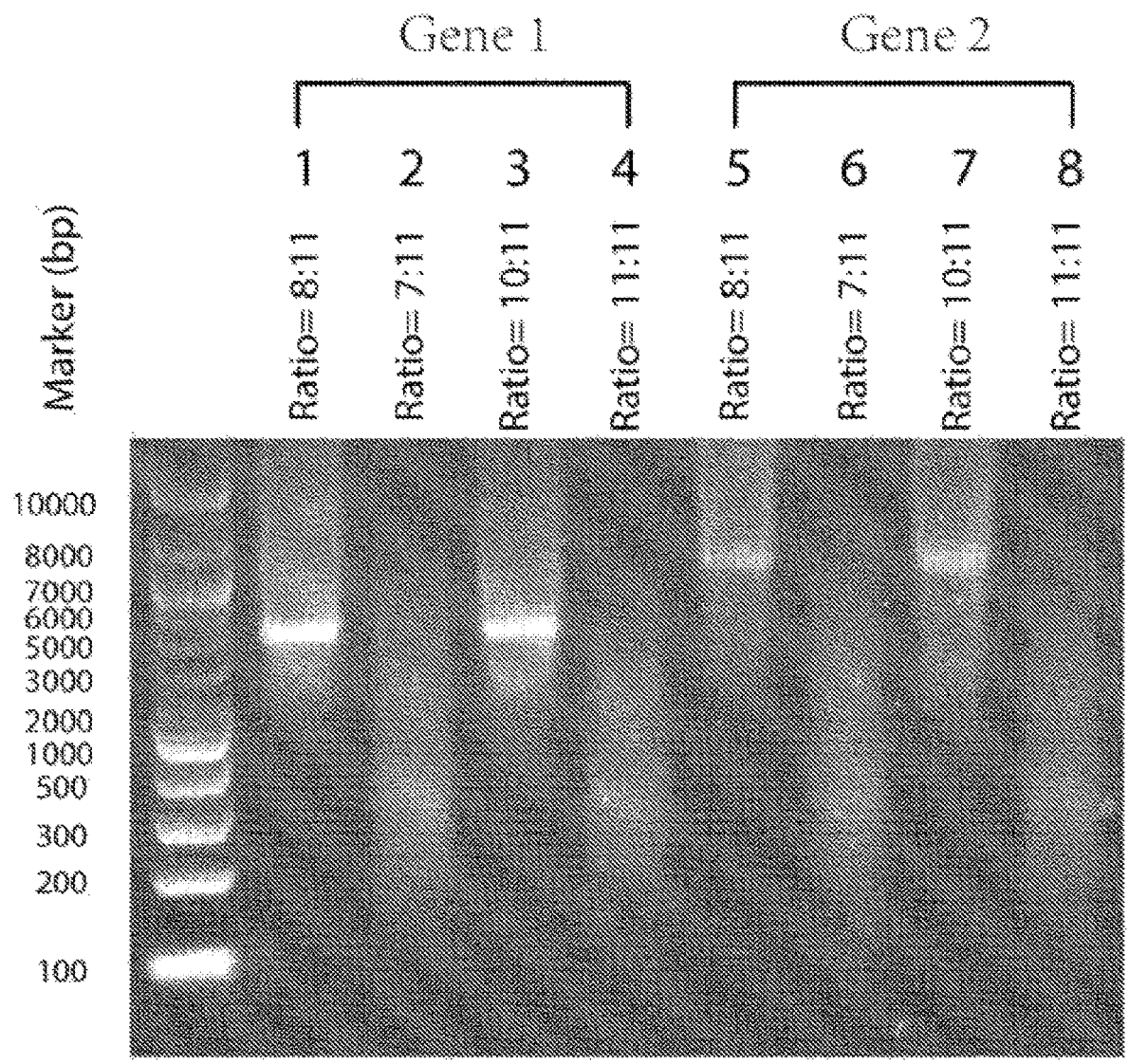
FIG. 2 is an electrophoresis image of the ligated and synthesized long-chain RNA under different mixing ratios of short RNA fragments and splint DNA fragments according to the example of the present invention.
Figure 3:
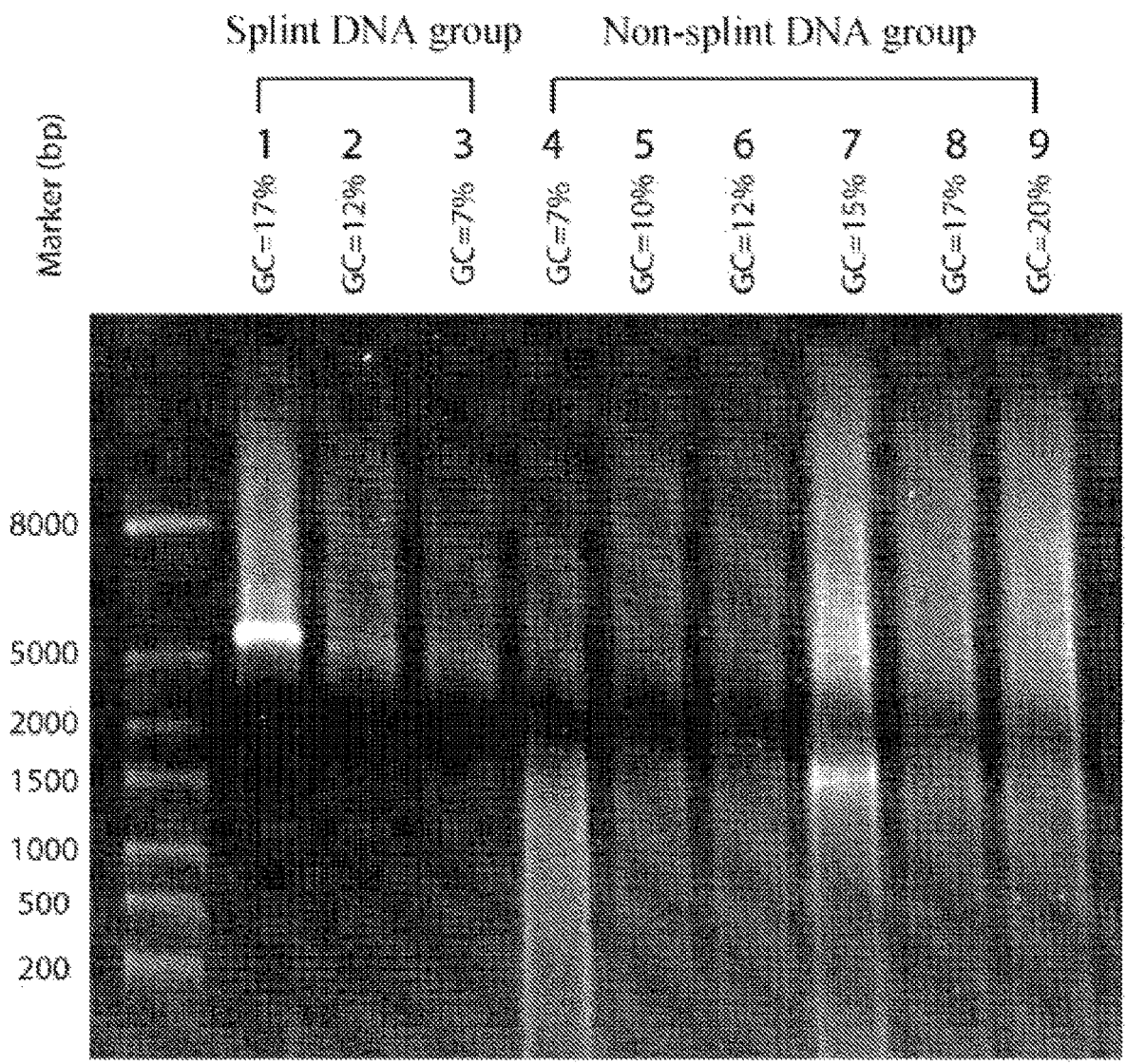
FIG. 3 is an electrophoresis image of the synthesized long-chain RNA with and without ligation of the splint DNA fragments according to the example of the present invention.

Referring to FIG. 1-3, FIG. 1 is a process flow diagram of an example of a method for large-scale synthesis of a long-chain RNA in the present invention; FIG. 2 shows the purification and purity analysis of the long-chain RNA obtained in an example of the present invention; and FIG. 3 shows the protein expression of the site-specific modified long-chain RNA obtained in an example of a method for site-specific modification of a long-chain RNA in the present invention.

Referring to FIG. 1, it can be seen that the working principle of the method for large-scale synthesis of a long-chain RNA in the present invention is as follows: first, a large number of different short RNA fragments (including the non-chemically modified short RNA fragments and the site-specific modified short RNA fragments) and the splint DNA fragments are chemically synthesized, then the different short RNA fragments are ligated by a biological method so as to form an uncapped long-chain RNA, finally, a cap structure is ligated to the uncapped long-chain RNA to form the target long-chain RNA. Specifically, in the example, a large number of the short RNA fragments and the splint DNA fragments are chemically synthesized; then the different short RNA fragments and the splint DNA fragments are ligated by a DNA ligase, and at the same time, the short RNA fragments and the 3' polyA tail are ligated by an RNA ligase to form the uncapped long-chain RNA; and then the cap structure is added to the 5' end of the uncapped long-chain RNA by a capping enzyme to form the capped long-chain RNA; finally, the splint DNA fragments in the capped long-chain RNA is removed by a DNase to obtain the desired long-chain RNA. The whole process is simple to operate and has a low production cost. The product long-chain RNA has a low mutation rate, a plurality of the short RNA fragments can be assembled in a single reaction, and the long-chain RNA can be synthesized at a high throughput so as to fulfill the large-scale production of the long-chain RNA. In addition, since the short RNA fragments are site-specific modified, the site-specific modification of the long-chain RNA can be realized, to enhance RNA stability and intracellular translation efficiency, and reduce RNA immunogenicity.

It should be understood that in other examples, the uncapped long-chain RNA can also be capped through the capping enzyme of one or a combination of RNA triphosphatase, RNA guanyltransferase, guanine-7-methyltransferase and 2'-O-methyltransferase. The Cap 0 cap structure is formed when the 7th carbon atom of G is methylated to form m7GPPPN; and the Cap 1 cap structure is formed when the 2'-0 position of the first nucleotide of a transcript is methylated to form m7GPPPNm.

It should be noted that the sequences of the short RNA fragments and the splint DNA fragments can be designed according to the specific structure of the RNA to be synthesized on a large scale, but they should meet the following requirements: 1) the designed and synthesized short RNA fragments have a length of 100-170 nt; 2) the GC base content of the short RNA fragments at 5' end and 3' end is higher than 15%; and 3) the GC base content of the splint DNA fragments at 5' end and 3' end is higher than 15%.

It is emphasized that the specific parameter values in the following examples are not unique, but are only a set of example data among many examples.

Example 1

Synthesis of Short RNA Fragments

In the example, the desired short RNA fragments were synthesized by solid-phase synthesis. It should be further noted that the entire reaction was carried out from 3' end to 5' end of the RNA.
1. Removing of the protecting group. The protecting group dimethoxytrityl (DMT) of a nucleotide pre-linked to a solid substrate was removed with trichloroacetic acid to obtain a free 5'-hydroxyl end.
2. Activation of reaction. The protonated nucleoside 3'-phosphoramidite monomers were mixed with a tetrazole activator and entered to a synthesis column to form an active phosphoramidite tetrazole intermediate. At this time, the 5' end of the active phosphoramidite tetrazole intermediate was still protected by DMT and the 3' end was activated.
3. Ligation reaction. The active phosphoramidite tetrazole intermediate obtained in step 2 was further deprotected and underwent a nucleophilic reaction with the 5'-hydroxyl end of the nucleotide obtained in step 1 for condensation and removal of tetrazole, to synthesize an oligosaccharide nucleotide chain extended by one base.
4. Oxidation reaction. It should be understood that when the condensation reaction in step 3 occurred, the nucleotide monomer was ligated to the oligosaccharide nucleotide linked to the solid substrate through a phosphite ester bond, but the phosphite ester bond was unstable and easily hydrolyzed by an acid/alkali. Therefore, the phosphoramidite was converted to phosphotriester with iodine in tetrahydrofuran to obtain a stable oligosaccharide nucleotide, and at this time, a deoxynucleotide was ligated to the nucleotide on the solid substrate.
5. Synthesis of crude RNA. The above steps were repeated, and then the protection group DMT on the 5'-hydroxyl end was removed by thiophenol. The connection between the short RNA fragments and the solid-phase resin were broken by concentrated ammonium hydroxide, such that the short RNA fragments can be eluted. Then the protection group DMT on the base was removed by the concentrated ammonium hydroxide under heating, the ammonium hydroxide was removed, and the product was dried in vacuum to obtain crude short RNA fragments.
6. Separation and purification. The obtained crude short RNA fragments were purified and separated by HPLC or PAGE to obtain the desired short RNA fragments.

Example 2

Ligation of Short RNA Fragments, Splint DNA Fragments and 3' polyA Tail

It should be noted that the splint DNA fragments are synthesized by a commercial chemical method, which is not specifically described.
1. Preparation of raw materials. 50 μL of RNase-free re-distilled water was measured, then the short RNA fragments obtained in example 1 which were calculated at a concentration of 8-10 μM and the commercially chemically synthesized short splint DNA fragments which were calculated at a concentration of 11 μM were weighed, and mixed to prepare a reaction system for a ligation mixture.
2. Pretreatment. The above reaction system was heated at 65° C. for 1-3 min and cooled at a room temperature for 1-3 min to remove the RNA with a tertiary structure, so as to obtain the RNA with a secondary structure.

3. Ligation reaction. According to the ratio of 1 μL of T4 DNA ligase and 0.1 μL of T4 RNA ligase to 0.1 μM of the short RNA fragments, an appropriate amount of the T4 DNA ligase, T4 RNA ligase and T4 DNA ligase buffer were added to the cooled reaction system. Incubation was conducted at a room temperature for 30-60 min to obtain an uncapped long-chain RNA.

4. Column purification. The uncapped long-chain RNA was placed on a filter and centrifuged at RCF 10,000-15,000×g for 15-60 s using a centrifugal column for purification of RNA, and washing was conducted to obtain the purified uncapped long-chain RNA. The results are specifically shown in FIG. 2.

5. Data analysis of result. As shown in FIG. 2, two genes are selected for experiments under a mixing ratio of the short RNA fragments and the splint DNA fragments at 8:11, 7:11, 10:11 and 11:11 respectively. Bands 1 to 4 are experimental results of gene 1 and bands 5 to 8 are experimental results of gene 2. It can be seen that when the mixing ratio of the short RNA fragments and the splint DNA fragments is 8:11 and 10:11, more long-chain RNAs are obtained. That is to say, when the mixing ratio of the short RNA fragments and the splint DNA fragments is 8-10:11, the short RNA fragments are more easily ligated.

Example 3

Capping of 5' End of Uncapped Long-Chain RNA

1. Preparation of heat-denatured RNA. 50-60 μg of the purified uncapped long-chain RNA (having a volume of less than 68.5 μL) prepared in example 2 was taken and RNase-free re-distilled water was added to enable the total volume of the whole system to be 68.5 μL; and the system was incubated at 65° C. for 5-10 min and transferred to ice to rapidly cool the pretreated uncapped long-chain RNA, so as to make the RNA maintain a single-stranded secondary structure.

2. Preparation of separation tube. 10 μL of 10× capping reaction buffer, 10 μL of GTP at a concentration of 10 μM, 5 μL of S-adenosyl-methionine (SAM) at a concentration of 2 mM and 2.5 μL of RNase inhibitor were taken respectively and mixed to enable the total volume of the whole separation tube system to be 27.5 μL.

3. Capping reaction. 68.5 μL of the heat-denatured RNA prepared in step 1 and 27.5 μL of the separation tube system prepared in step 2 were mixed, and 4 μL of the capping enzyme mixture (it should be understood that the capping enzyme in the example includes but is not limited to one or a combination of 2'-O-methyltransferase, RNA triphosphatase, RNA guanyltransferase and guanine-7-methyltransferase) was added; the mixture was incubated at 37° C. for 30 min for the capping reaction to obtain a long-chain RNA with the Cap 0 or Cap 1 cap structure, and at this time, the whole capping reaction system had a total volume of 100 μL.

Example 4

Removal of Splint DNA Fragments

1. Experimental procedure. 1 μL of the DNase was added to 100 μL of the capping reaction system obtained in example 3 and mixed evenly; then the mixture was incubated at 37° C. for 15 min to remove the splint DNA in the capped long-chain RNA to obtain the desired long-chain RNA. The results are specifically as shown in FIG. 3.

2. Analysis of result. FIG. 3 is a gel electrophoresis image of the RNA without purification, comprising MarkerRNA, the RNA ligated with the splint DNA fragments (splint DNA group, bands 1-3) and the RNA not ligated with the splint DNA fragments (non-splint DNA group, bands 4-9). Specifically, the splint DNA group (bands 1-3) has a relatively high purity of RNA with no hybrid bands; and the non-splint DNA group (bands 4-9) has a low purity of RNA with many hybrid bands. Through comparison, it can be seen that when the splint DNA fragments are used to ligate a plurality of the short RNA fragments, the ligation efficiency of the RNA can be significantly improved and the mismatch rate is greatly reduced. Moreover, the splint DNA group (bands 1-3) shows the result of gel electrophoresis of RNA with the splint DNA fragments of different GC contents, wherein band 1 shows the result with the splint DNA fragments having a GC base content of 17%, band 2 shows the result with the splint DNA fragments having a GC base content of 12%, and band 3 shows the result with the splint DNA fragments having a GC base content of 7%. It can be seen that when the splint DNA fragments having a GC base content of 17% are used to ligate a plurality of the short RNA fragments, the ligation efficiency of the long-chain RNA is relatively higher. It should be understood that the splint DNA fragments having a GC base content of 17% is only a specific example. In other examples, as long as the splint DNA fragments have a GC base content of 15% or more, the ligation efficiency of the long-chain RNA can be significantly improved.

Example 5

Purification of Long-Chain RNA

It should be understood that there are many method for purifying long-chain RNA, including but not limited to lithium chloride/ethanol precipitation, centrifugal column, chlorine extraction/ethanol precipitation, gel purification and purification by high performance liquid chromatography. In the example, HPLC is mainly used for purification.

1. Elution. A column matrix (21 mm*100 mm column) made of alkylated non-porous polystyrene-divinylbenzene copolymer microspheres (2.1 mm) was used in a high performance liquid chromatograph (Akta purifier, GE Healthcare) for direct purification. The buffer A contained 0.1 M triethylammonium acetate (TEAA) at a pH of 7.0; and the buffer B contained 0.1 M TEAA and 25% acetonitrile (transgenic) at a pH of 7.0. The chromatographic column was equilibrated with 30% buffer and then loaded with the long-chain RNA obtained in example 4 and run to 55% buffer or 65% buffer with a single or two linear gradients within 20-30 min at a flow rate of 5 mL/min to purify the long-chain RNA.

Figure 5:
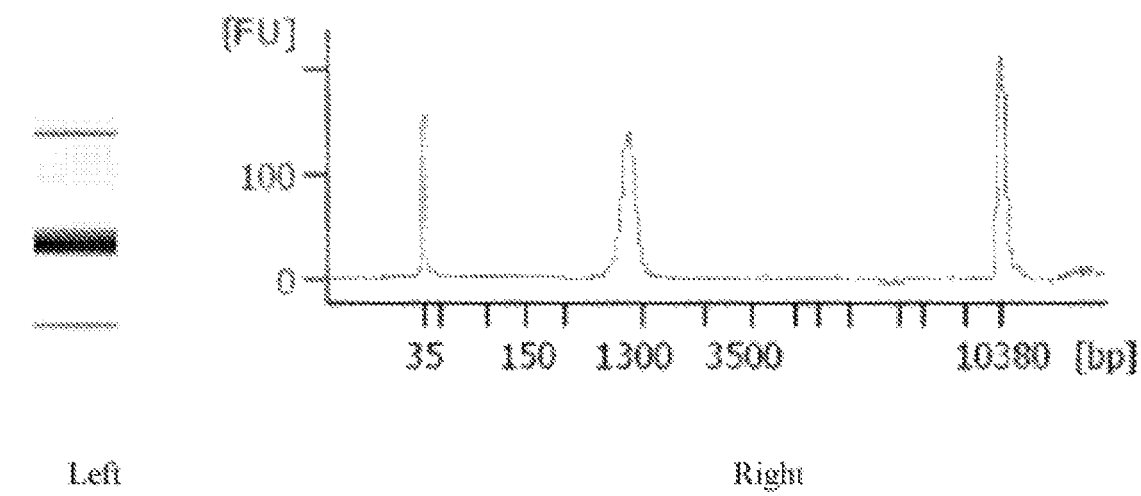
FIG. 5 shows the purity detection of the synthesized long-chain RNA with ligation of the splint DNA fragments according to the example of the present invention.

2. Analysis. The long-chain RNA was analyzed with the same column matrix and buffer system as in step 1 and the chromatographic column having a size of 7.8 mm*50 mm, at a flow rate of 1.0 mL/min. The results are shown in FIG. 5.

Example 6

Detection of Purity

Figure 4:
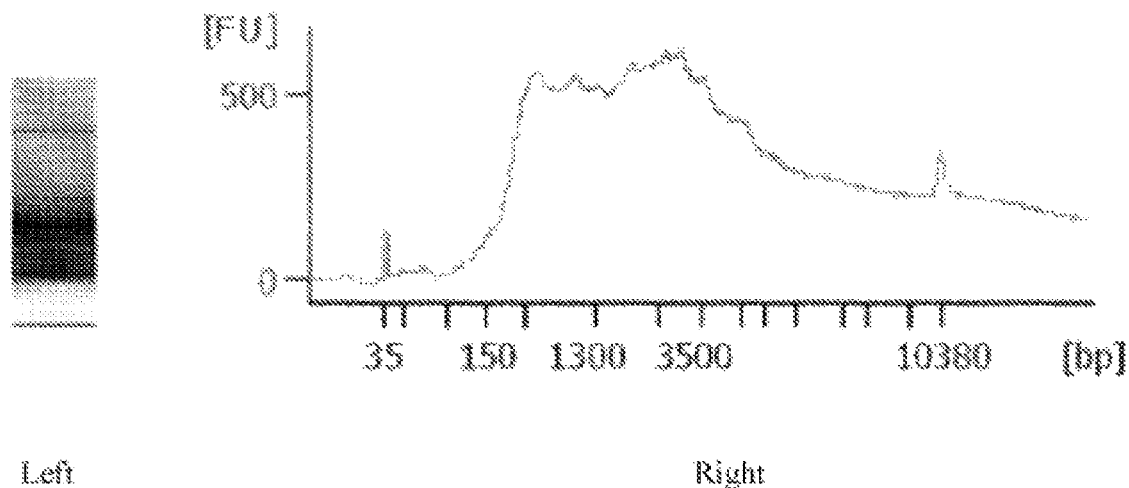
FIG. 4 shows the purity detection of the synthesized long-chain RNA without ligation of the splint DNA fragments according to the example of the present invention.

In the example, gel electrophoresis technique is used to analyze the purity of the desired long-chain RNA obtained in example 4.
1. Preparation of 2×RNA loading buffer. The gel was prepared according to the following formula: 95% of formamide, 0.025% of SDS, 0.025% of bromophenol blue, 0.025% of xylene cyanol and 0.5 mM of ethylenediaminetetraacetic acid. The materials were thoroughly mixed and dissolved; the mixture was allowed to stand for 24 h to form the agarose gel.
2. Electrophoresis. After stained with ethidium bromide, the samples were run on the prepared agarose gel and then observed and photographed under a gel imaging system. The specific results are shown in FIG. 4 and FIG. 5.
3. Data analysis of result. Specifically, as shown in FIG. 4, the left is the electrophoresis image of the whole synthesized long-chain RNA without use of the splint DNA fragments and the right is an analysis report of the electrophoresis result. It can be clearly known that when the splint DNA fragments are not used for ligation, the purity of the obtained long-chain RNA product is relatively lower with many hybrid bands and the ligation efficiency of the short RNA fragments is low. As shown in FIG. 5, the left is the electrophoresis image of the synthesized long-chain RNA with the splint DNA fragments for ligation and the right is an analysis report of the electrophoresis result. It can be clearly known that when the splint DNA fragments are used for ligation, the purity of the obtained long-chain RNA product is significantly improved, with no hybrid bands. Compared with the traditional chemical method, the ligation efficiency of the long-chain RNA prepared by the present invention is greatly improved, and the ligation mismatch rate of the short RNA fragments is greatly reduced.

Example 7

Figure 6:
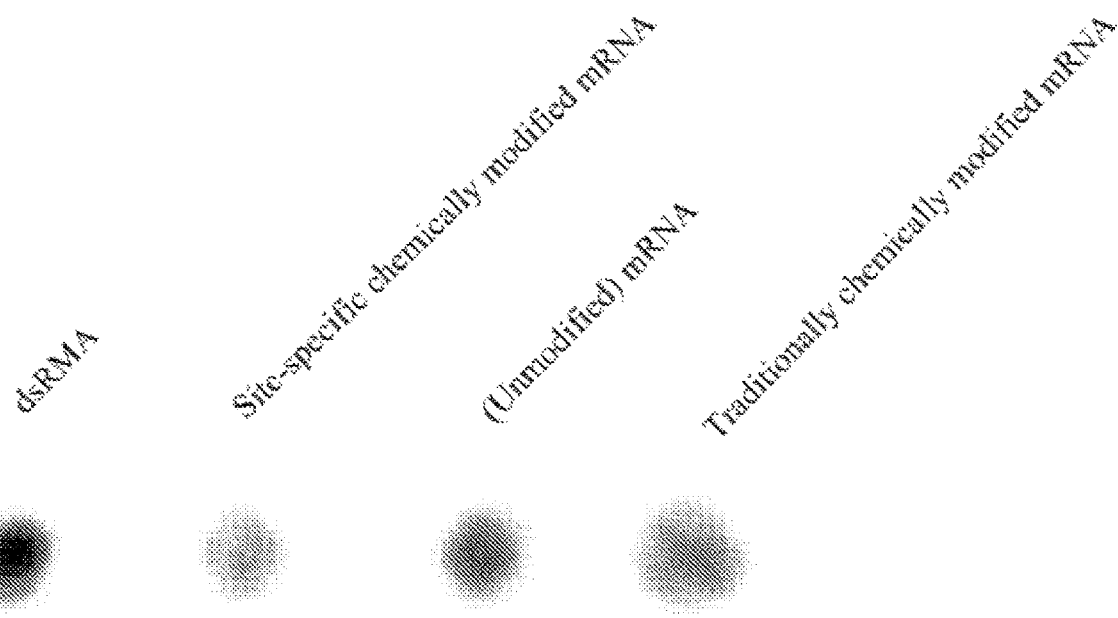
FIG. 6 shows the result of a dot blot assay that adopts a K1 monoclonal antibody to identify dsRNA according to the example of the present invention.
Figure 7:
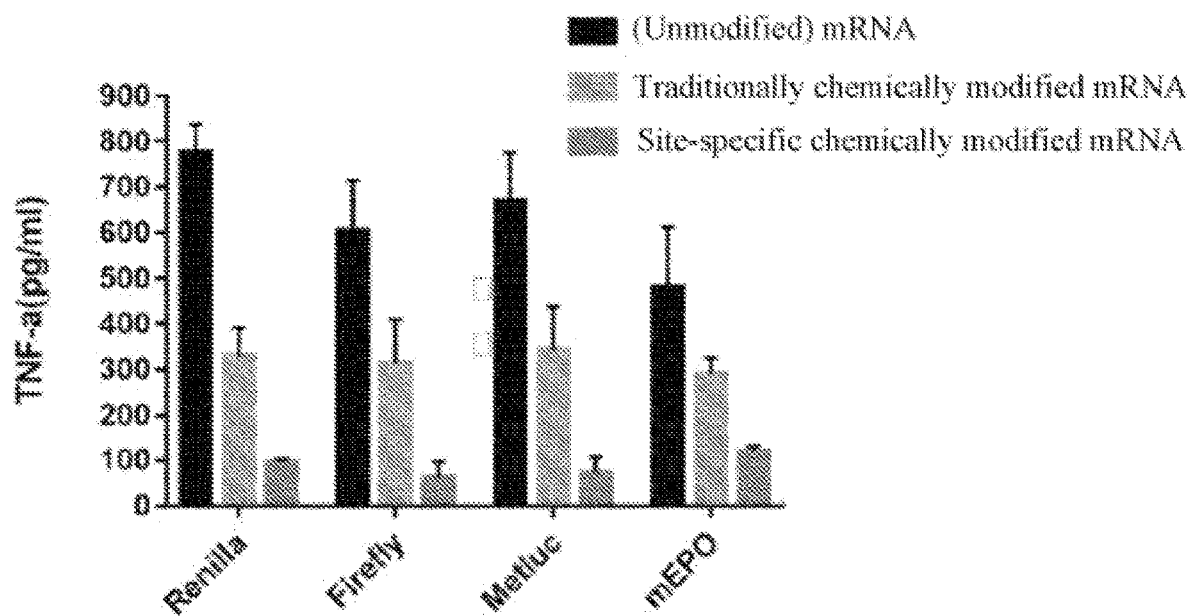
FIG. 7 shows the detection result of the level of tumor necrosis factor-$\alpha$ according to the example of the present invention.
Figure 8:
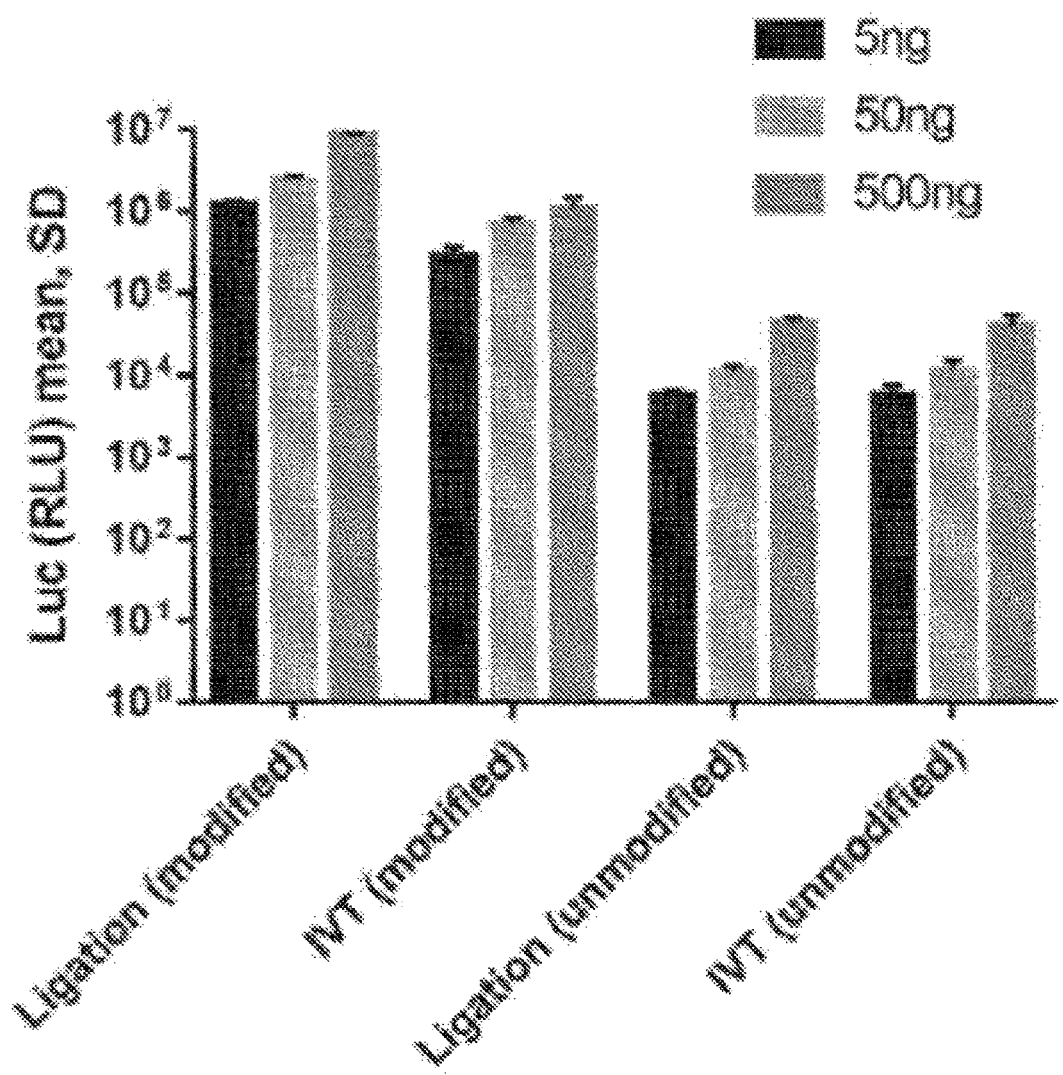
FIG. 8-10 show the expressions of site-specific chemically modified genes according to the example of the present invention.
Figure 9:
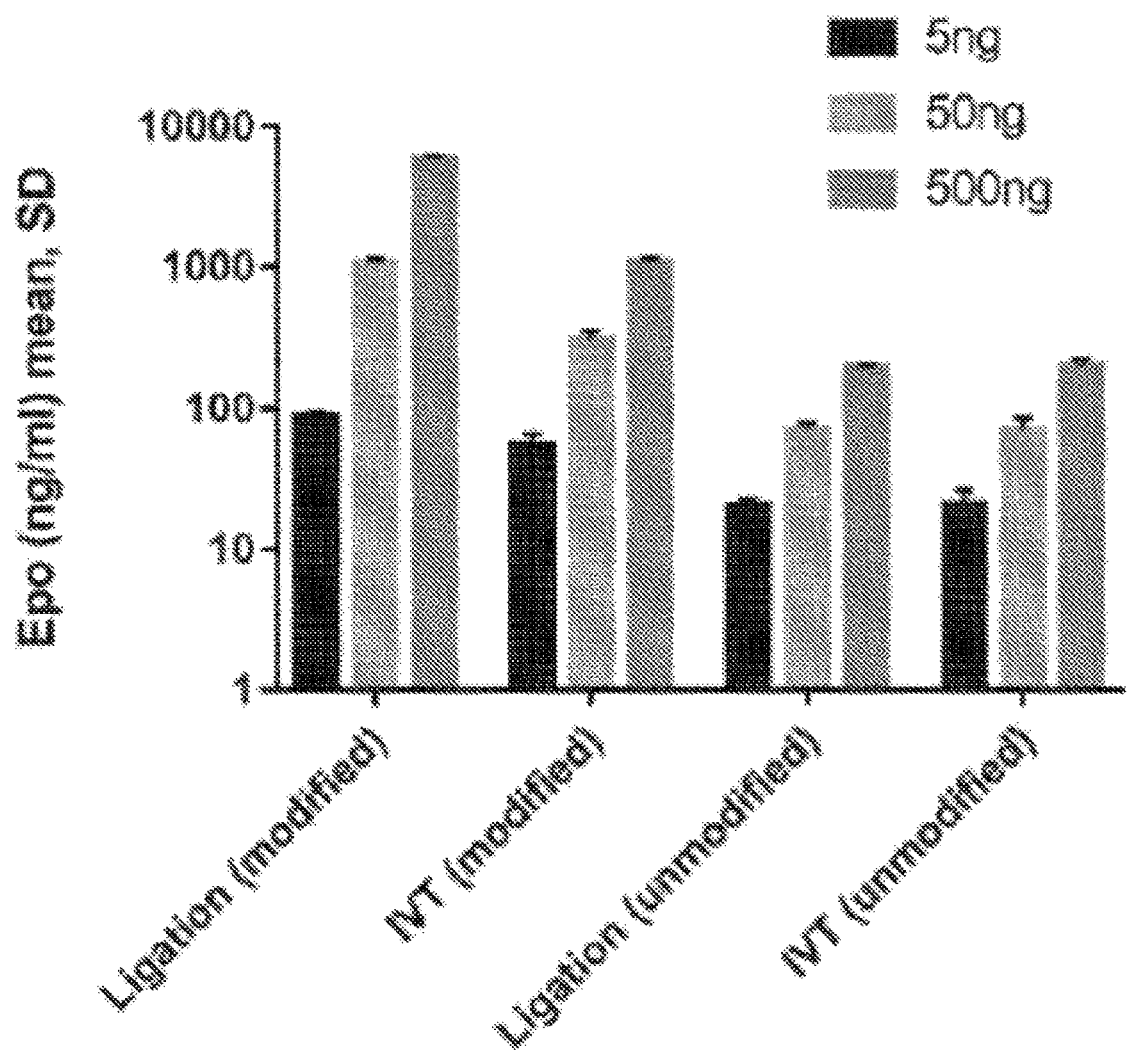

Site-Specific Modification of Long-Chain RNA
1. Site-specific chemical modification was conducted on the designated short RNA fragments obtained in example 1. Specifically, in this example, Pseudo UTP is used to replace natural UTP and 5me CTP is used to replace natural CTP in the designated short RNA fragments so as to realize the site-specific chemical modification of the UTP and the CTP of the designated short fragments without affecting the UTP and the CTP bases in other unselected short RNA fragments; then through the experimental schemes in example 2 to example 6, synthesis of the short RNA fragments to the long-chain RNA is achieved. In the whole process, since only the designated short RNA fragments are subjected to site-specific modification, the site-specific modification is only formed in the designated fragments of the formed long-chain RNA, which is completely different from the traditional site-specific modification of the long-chain RNA. The method of the present invention can realize the localized site-specific modification of the long-chain RNA to reduce the secondary structure of the long-chain RNA (it should be understood that secondary structure and double-stranded RNA can cause an immune response in the body), greatly reduces the immunogenicity of the long-chain RNA, is beneficial to analyze the long-chain RNA, and has broader prospects for medical experiments. Specifically, a dot blot assay (Schonborn, J., Oberstrass, J., Breyel, E., Tittgen, J., Schumacher, J. and Lukacs, N. (1991) which uses K1 monoclonal antibodies (mAbs) to recognize dsRNA was employed in this example. Monoclonal antibodies to double-stranded RNA were used as probes of RNA structure in crude nucleic acid extracts (*Nucleic Acids Res*, 19, 2993-3000) in the example to determine whether RNA contains DNA in in-vitro transcription. No monoclonal antibody that recognizes a continuous double-stranded structure with a length of at least 40 bp was found in any coding sequence or UTRs of a plurality of monoclonal antibodies analyzed in the example (Bonin, M., Oberstrass, J., Lukacs, N., Ewert, K., Oesterschulze, E., Kassing, R. and Nellen, W. (2000). Determination of binding sites for anti-DNA antibodies on double-stranded RNA by scanning force microscopy. RNA, 6, 563-570). Mammalian and labeled protein-encoding in-vitro transcripts were further tested, including site-specific modification, non-modification, and traditional modification. It can be found that the site-specific modification can significantly reduce the secondary structure of the long-chain RNA, as shown in FIG. 6 and FIG. 7.
2. Mouse luciferase-encoding gene and mouse erythropoietin gene were selected respectively in the example for experiments. Specifically, in the experiment on the mouse luciferase-encoding gene, two reactions for synthesizing long-chain RNA were selected for the site-specific modification experiment. One was Ligation (modified): in the process of commercially chemically synthesizing the short RNA fragments, Pseudo UTP was used to replace natural UTP, 5me CTP was used to replace natural CTP, and the short RNA fragments were spliced and synthesized to the long-chain RNA under the action of a ligase; and the other was IVT (unmodified): the modified long-chain RNA was synthesized by a traditional in-vitro transcription method, wherein the Pseudo UTP was used to replace the natural UTP and the 5me CTP was used to replace the natural CTP. In addition, two control group experiments were set for the above two synthesis reactions, namely Ligation (unmodified) and IVT (unmodified). The expression results are shown in FIG. 8 and FIG. 9. Furthermore, in the example, haematocrit of mice was also measured with the expression results shown in FIG. 10.
3. Data Analysis of Result As shown in FIG. 6, 200 ng of in-vitro transcribed RNA was used to encode mEPO, and the dot blot assay mentioned in step 1 which uses K1 monoclonal antibodies to recognize dsRNA were employed for analysis. The dsRNA positive control experiment contained the dsRNA with a length of 328 bp (25 ng). It is known that the in-vitro transcribed RNA is immunogenic and contains DNA contaminants.

As shown in FIG. 7, dendritic cells were treated with mRNAs of the intracellular reninase (T7TSRenA30), luciferase (T7TSLucA30), luciferase (T7TSMetlucA30) and methoxyphosphine (TEVmEPOA51), respectively. After 24 h, the level of the tumor necrosis factor-α (TNF-a) were measured in the supernate. It can be seen that the level of the tumor necrosis factor-α is the lowest in the long-chain RNA modified by site-specific chemical modification and the immunogenicity of the long-chain RNA is greatly reduced, which is beneficial to research on clinical RNA drugs.

As shown in FIG. 8, 5 ng, 50 ng and 500 ng of the long-chain RNAs were transfected into Hela cells respectively, the long-chain RNAs were obtained under different conditions of Ligation (modified), IVT (unmodified), Ligation (unmodified) and IVT (unmodified) in step 2, and the expression of the luciferase was measured after 24 h. When 500 ng of the long-chain RNA is transfected into the Hela cells, the expression of the obtained luciferase is the largest. Furthermore, the expression of the luciferase in the site-specific chemically modified long-chain RNA is much higher than that in the unmodified long-chain RNA. Besides, for the modified long-chain RNA, the content of the luciferase expressed by the site-specific chemically modified long-chain RNA in the present invention is nearly an order of magnitude higher than that in a traditional in-vitro transcription method.

As shown in FIG. 9, 5 ng, 50 ng and 500 ng of the long-chain RNAs were transfected into Hela cells respectively, the long-chain RNAs were obtained under different conditions of Ligation (modified), IVT (unmodified), Ligation (unmodified) and IVT (unmodified) in step 2, and the expression of erythropoietin was measured after 24 h. When 500 ng of the long-chain RNA is transfected into the Hela cells, the expression of the obtained erythropoietin is the largest. Furthermore, the expression of the erythropoietin in the site-specific chemically modified long-chain RNA is much higher than that in the unmodified long-chain RNA. Besides, for the modified long-chain RNA, the content of the erythropoietin expressed by the site-specific chemically modified long-chain RNA in the present invention is nearly 11 times of that in a traditional in-vitro transcription method.

Figure 10:
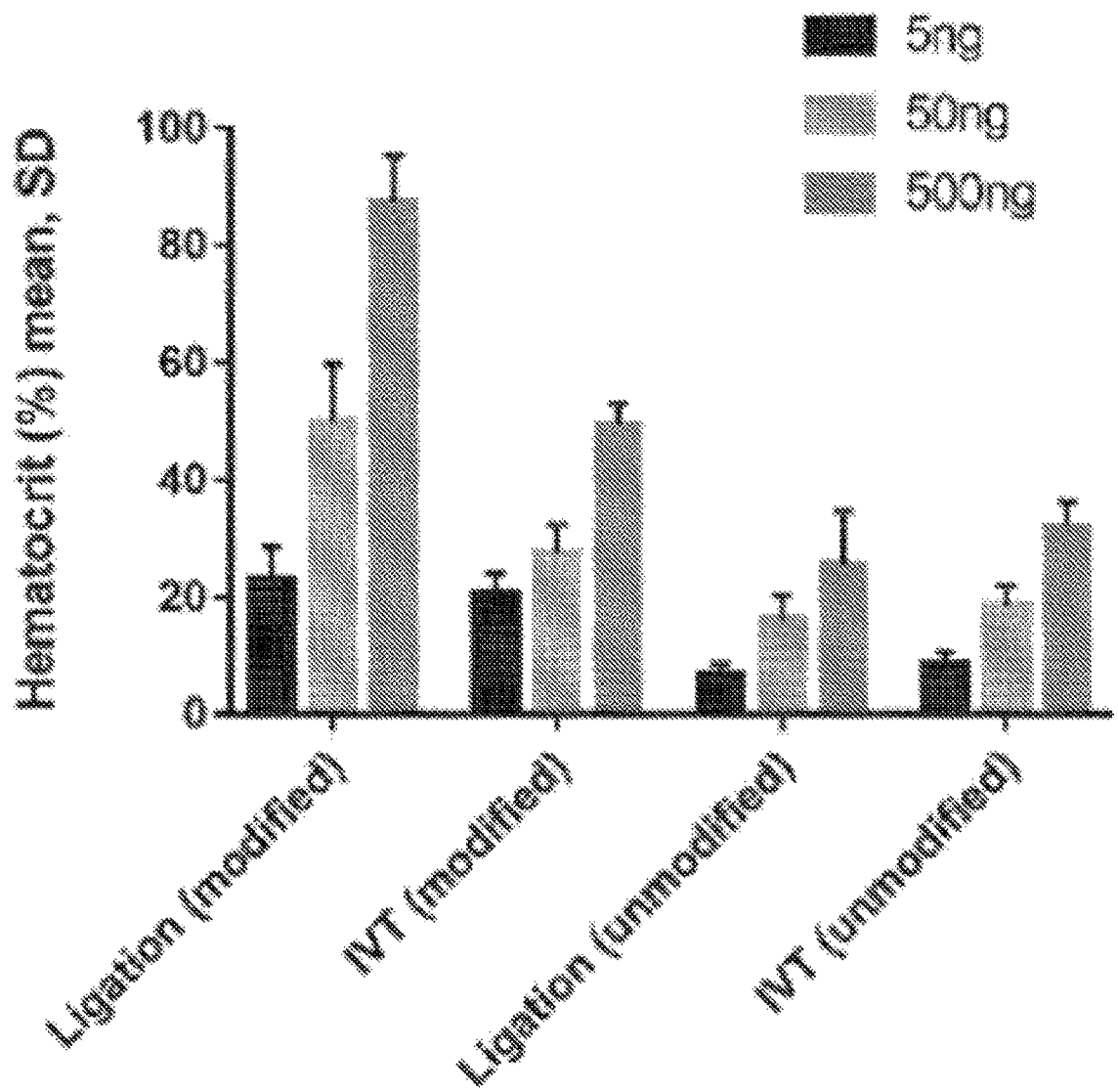

As shown in FIG. 10, the mice were transfected with 5 ng, 50 ng and 500 ng of the long-chain RNAs obtained by Ligation (modified), IVT (unmodified), Ligation (unmodified) and IVT (unmodified), respectively, and the expression of the haematocrit was measured after 7 d. When 500 ng of the long-chain RNA is transfected into the mice, the expression of the obtained haematocrit is the largest. Furthermore, the haematocrit of the mice in the site-specific chemically modified long-chain RNA is much higher than that in the unmodified long-chain RNA. Besides, for the modified long-chain RNA, the haematocrit expressed in the site-specific chemically modified long-chain RNA in the present invention is nearly three times of that in a traditional in-vitro transcription method.

It should be understood that the method for large-scale synthesis of a long-chain RNA in the examples of the present invention has a lower cost and stable structure compared with the traditional synthesis of a long-chain RNA. Besides, the present invention further provides a method for site-specific chemical modification of a designated sequence. The method overcomes the disadvantages that the site-specific modification can only be conducted on the entire RNA molecule in the traditional site-specific chemical modification method, and realizes different site-specific modifications on different designated fragments of the long-chain RNA molecule. Moreover, due to the particularity of the method for site-specific modification of a long-chain RNA provided by the examples of the present invention, it can realize various modifications to specific bases on the RNA molecule, which is beneficial to research on cell experiments, animal experiments and clinical RNA drug functions.

The above descriptions are only preferred examples of the present invention and not intended to limit the scope of the present invention. The equivalent structural transformations made by using the inventive concept of the present invention according to the contents of the description and drawings of the present invention, or direct/indirect application in other related technical fields are included in the protection scope of the present invention.

What is claimed is:

1. A method for large-scale synthesis of a long-chain RNA, comprising:
   (a) obtaining a mixture comprising a plurality of short RNA fragments and a plurality of splint DNA fragments, wherein the plurality of short RNA fragments are ligated to form the long-chain RNA, and wherein each of the plurality of splint DNA fragments comprises a sequence that is complementary to 3' end of one of the plurality of short RNA fragments and 5' end of its downstream short RNA fragment; and
   (b) adding a DNA ligase and an RNA ligase to the mixture, thereby obtaining the long-chain RNA,
      wherein the method further comprises a step (a') after (a) but prior to (b), wherein step (a') comprises site-specific chemical modification of one or more short RNA fragments of the plurality of short RNA fragments.

2. The method of claim 1, wherein each of the plurality of short RNA fragments is about 100 to about 170 nucleotides long.

3. The method of claim 1, wherein GC base content of the plurality of short RNA fragments is higher than 15%.

4. The method of claim 1, wherein the plurality of short RNA fragments are synthesized by solid-phase synthesis.

5. The method of claim 1, wherein the mixture in step (a) further comprises a poly-A tail.

6. The method of claim 1, wherein the site-specific modification comprises replacing natural UTP with Pseudo UTP, replacing natural CTP with 5me CTP, or any combination thereof.

7. The method of claim 1, wherein the site-specific modification occurs only on designated short RNA fragments without affecting unselected short RNA fragments.

8. The method of claim 1, wherein the site-specific modification reduces the secondary structure of the long-chain RNA.

9. The method of claim 1, wherein the site-specific modification reduces immunogenicity of the long-chain RNA.

10. The method of claim 1, wherein the site-specific modification increases a production of a protein that is translated from the long-chain RNA.

11. The method of claim 1, wherein each of the plurality of splint DNA fragments is about 30 to about 40 nucleotides.

12. The method of claim 1, wherein GC base content of the plurality of splint DNA fragments is higher than 15%.

13. The method of claim 1, wherein a ratio of molar concentrations between the plurality of short RNA fragments to the plurality of splint DNA fragments is about 8:11, 9:11, or 10:11.

14. The method of claim 1, wherein the ratio of volume between the DNA ligase and the RNA ligase is about 10:1.

15. The method of claim 1, wherein the method further comprises (c) capping the long-chain RNA in step (b) with a cap structure.

16. The method of claim 15, wherein the cap structure is a Cap 0 or a Cap 1.

17. The method of claim 15, wherein the capping is catalyzed by a capping enzyme, wherein the capping enzyme is an RNA triphosphatase, an RNA guanyltransferase, guanine-7-methyltransferase, 2-O-methyltransferase, or any combination thereof.

18. The method of claim 15, wherein the method further comprises (d) adding a DNase to the long-chain RNA in step (c) to remove the plurality of splint DNA fragments.

19. The method of claim 18, wherein the method further comprises (e) purifying the long-chain RNA in step (d) by lithium chloride/ethanol precipitation, centrifugal column, chlorine extraction/ethanol precipitation, gel purification or purification by high performance liquid chromatography (HPLC), or any combination thereof.

20. The method of claim 19, wherein the method further comprises (f) detecting purity after (e) by agarose or polyacrylamide gel electrophoresis, HPLC analysis and detection, endotoxin residue detection, DNA residue detection, protein residue detection, or any combination thereof.

* * * * *